(12) United States Patent
Bassom et al.

(10) Patent No.: US 7,953,786 B2
(45) Date of Patent: May 31, 2011

(54) METHOD AND SYSTEM FOR PREFERENCES-BASED MAIL DISTRIBUTION AND DIGITAL POSTAL SERVICES

(75) Inventors: Sara H. Bassom, White Plains, NY (US); Alexander Faisman, Croton-on-Hudson, NY (US); Genady Grabarnik, Scarsdale, NY (US); Edward E. Kelley, Wappingers Falls, NY (US); Frances W. West, Newton, MA (US)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 12/028,881

(22) Filed: Feb. 11, 2008

(65) Prior Publication Data

US 2009/0204624 A1 Aug. 13, 2009

(51) Int. Cl.
*G06F 15/16* (2006.01)
(52) U.S. Cl. .......... 709/201; 709/202; 709/206
(58) Field of Classification Search .......... 709/201, 709/202, 206
See application file for complete search history.

(56) References Cited

U.S. PATENT DOCUMENTS

| 5,424,724 | A | 6/1995 | Williams et al. |
| 6,285,777 | B2 | 9/2001 | Kanevsky et al. |
| 6,604,132 | B1 | 8/2003 | Hitt |
| 6,697,843 | B1 | 2/2004 | Carlin et al. |
| 7,010,572 | B1 | 3/2006 | Benjamin et al. |
| 7,430,554 | B1 * | 9/2008 | Heisinger, Jr. .......... 1/1 |
| 2001/0042047 | A1 * | 11/2001 | Nishida .......... 705/51 |
| 2006/0184397 | A1 * | 8/2006 | Wester .......... 705/4 |
| 2008/0159519 | A1 * | 7/2008 | Lovric et al. .......... 379/265.09 |
| 2008/0181225 | A1 * | 7/2008 | Zampiello .......... 370/390 |

* cited by examiner

*Primary Examiner* — Liangche A Wang
(74) *Attorney, Agent, or Firm* — Whitham, Curtis, Christofferson & Cook, P.C.; John R. Pivnichny

(57) ABSTRACT

A system and method for collecting and storing communications preferences of recipients and delivering communications to a recipient in accordance with the recipient's preferences is disclosed herein. Preferably, the communications preferences consist of at least one mail formatting preference and at least one sending preference. The system automatically formats a message in accordance with the intended recipient's communications preferences stored in a profile table. In an alternative embodiment, the system provides for a prompting function that can alter the communications preferences in the event that a particular preference must be changed. This prompting function is also useful if recipient does not have a corresponding profile in the profile table.

20 Claims, 5 Drawing Sheets

FIG. 3

PROFILE TABLE

| | Name | Delivery Address | E-Mail Address | Mail Format Preference 1 | Mail Format Preference 2...n | Sending Preference 1 | Sending Preference 2...n | Other Preferences |
|---|---|---|---|---|---|---|---|---|
| 1. | Joe Smith | 9 Oak St., New York, NY | js@option.net | Digital text | Format readable in MS Word | E-mail | Password-protected attachment | --- |
| 2. | Jane Doe | 3 Sum St., Boston, MA | jd@gmail.net | Braille | Format readable in Braille software | E-mail | --- | Send e-mailing notification to mobile phone |
| 3. | John Lock | 2 Inn St., St. Louis, MO | JL@gmail.net | Digital text | .rtf format | Digital Mailbox | E-mail | Invitations to social events via e-mail; all other correspondence to Digital Mailbox |
| 4. | Sue Bean | 5 Park Place, New York, NY | sb@link.net | Audio | CD-readable format | E-mail | --- | --- |
| 5. | Tom Franks | 3 Ventnor Ave., Essex, VT | tf@mssn.net | Spanish language | Printed text | First-class mail | --- | Send mailing notification to PDA |
| 6. | Adam Jones | 4 Connecticut Ave., Washington, DC | aj@link.net | Video | .wmv format | Digital Mailbox | --- | --- |

METHOD AND SYSTEM FOR PREFERENCES-BASED MAIL DISTRIBUTION AND DIGITAL POSTAL SERVICES

BACKGROUND OF THE INVENTION

1. Field of the Invention

The present invention generally relates to a method and system for distributing mail. In particular, the present invention provides a method and system for formatting and distributing mail based on a recipient's preferences.

2. Description of the Prior Art

Many people today utilize multiple mail services to send various types of mail. For example, a person may use the U.S. Postal Service to mail documents that are too large to send via e-mail. In turn, a person may use e-mail to send documents in an electronic format that requires editing by the recipient. These traditional methods of distributing mail each have positive and negative aspects.

The use of a traditional paper-based postal services has a "built-in" spam protection. In particular, because the sender is paying for mail distribution, large scale abuse of the postal mail services is minimal. Nevertheless, traditional mail tends to include varying amounts of advertisements or other free promotional material. While the stream of such materials may be welcomed by the recipient, the amount of paper consumption is high, as well as the costs associated with such mail delivery. Further, such paper-based mail may present an inconvenience to recipients with vision or reading impairments, or those who would prefer mail in a digital format for purposes of mail management, storage and the like.

Paper consumption and costs associated with the use of electronic mail is minimal as compared to traditional paper-based mail services. However, electronic mail can be easily abused by computer hackers. Further, electronic mailboxes are usually flooded with spam mail, viruses, or other types of unwanted electronic or digital communications that make it frustrating for the recipient, and potentially damaging to the recipient's computer privacy.

What is needed is a simple, automated (or semi-automated) method and system to send mail to a recipient based on the recipient's preferences for the way mail is received and the medium by which it is received. Such a method and system could ensure that paper consumption and mail costs remain low for the sender, and assure that mail is in a format preferred by the recipient. Such a method and system could be used by individuals, as well as large organizations (e.g., universities).

SUMMARY OF THE INVENTION

The present invention provides a system and method for collecting and storing communications preferences of recipients and delivering communications to a recipient in accordance with the recipient's preferences. Preferably, the communication preferences are comprised of two types: mail format preferences, and sending preferences. The mail format preferences are those that pertain to format the message itself (e.g., font, type size, language, color, etc.). The mail formatting can be performed based on a variety of commercially available mediums, including, but not limited to, word processors, graphics software, audio software, video software, and/or braille software. The sending preferences are those that pertain to how the message is to be sent to the recipient. The sending preferences can be performed based by a variety of delivery means or transmission mediums including, but not limited to, postal mail, overnight delivery, e-mail, and/or digital mailbox. The communications preferences can further be narrowed to include other preferences such as subject matter (for example, invitations to social events via e-mail, but all other types of communications via postal mail).

The recipient's communications preferences are stored in a profile table. The profile table can be manually compiled, or automatically updated depending on the user requirements or preferences. The profile table compiles the recipient's name, postal address, e-mail address, and communications preferences. Preferably, the communications preferences consist of at least one mail formatting preference and at least one sending preference.

In the present method, the user prepares the message to be sent. Included in the message is the recipient's name, or other identifying feature that allows the system to cross-reference and extract the corresponding recipient's communications preferences from the profile table. Although the invention assumes that the user prepares the message in an electronic or digital format, it is contemplated that the present invention can be modified to prepare the message in a paper format, for example, which may be convertible to an electronically transmittable form. Once the message is ready to be sent in any given form, the system locates the recipient's profile in the profile table and extracts the recipient's preferences for formatting and receiving the message. A recipient's communications preferences in the profile table can be created manually by the system user.

Upon extraction of the recipient's preferences, the system formats the message according to the communications preferences. The system is capable of formatting the message according to more than one communications preference. It is contemplated by the present invention that the number and combination of possible preferences is potentially limitless. After the formatting is complete in accordance with the mail formatting preferences, the system then further formats based on the sending preferences. Depending on the sending preferences, the system either prints out a hard copy of the mail to send to the recipient via actual physical delivery, keeps the mail in electronic or digital format for electronic delivery, and/or provides conversion among electronically transmittable formats, as needed (e.g., braille, audio/visual files, language conversion, and the like).

As an alternative to electronically delivering mail to the recipient via e-mail address, the present invention further provides for a digital mailbox. The digital mailbox is accessible by only the sender and recipient. Because of the limited accessibility, the digital mailbox ensures protection of privacy and avoids potential spamming and viruses that are very commonly associated with standard electronic mailing.

In an alternative embodiment of the present invention, the method and system as described above includes prompting options in order to perfect the features or preferences. In addition, the prompting function can alter the communications preferences in the event that a particular preference must be changed on a one time basis. This prompting function can also be useful if the recipient does not have a corresponding profile in the profile table (i.e., for one-time only recipients). In the event that no recipient profile is available, the message is formatted based on the user's preferences.

In this alternative embodiment, the user prepares the message to be sent. Once the message is ready to be sent, the system prompts the user to either locate the recipient's profile in the profile table, or format manually according to the user's preferences. If the user chooses to locate the recipient's profile and extract the recipient's preferences, then the system will automatically format the mail per the recipient's preferences in the manner previously discussed. Once the formatting is completed pursuant to the recipient's preferences, the system will prompt the user to either format the mail further according to the user's preferences, or send the mail and exit the system.

If the user chooses to format the message manually, the system will prompt the user through a plurality of available communications preferences, both of which according to the user's preferences. Once fully formatted according to the user's preferences, the message is sent to the recipient.

It is contemplated by the present invention that the number and combination of available communications preferences is potentially limitless. For example, the mail formatting preferences may include, but are not limited to, any one of the following mail formatting preferences: digital text, printed text, braille, audio, video, and/or image. Each of these mail formatting preferences can also be formatted further in a manner including, but not limited to, the following additional preferences: mail type, file format, font, size, language, sound setting, color, and/or file compression. Further, the sending format preferences can include, but are not limited to, any one of the following preferences: postal service delivery, electronic delivery, CD, e-mail, digital mailbox, telephone and/or PDA. Thus, it is clearly seen that the potential combinations of formatting preferences are limitless.

The present invention also includes a computer system for implementing the present method.

BRIEF DESCRIPTION OF THE DRAWINGS

The foregoing and other objects, aspects and advantages will be better understood from the following detailed description of a preferred embodiment of the invention with reference to the drawings, in which:

FIG. 3 shows a profile table according to the present invention.

DETAILED DESCRIPTION OF A PREFERRED EMBODIMENT OF THE INVENTION

Figure 4:
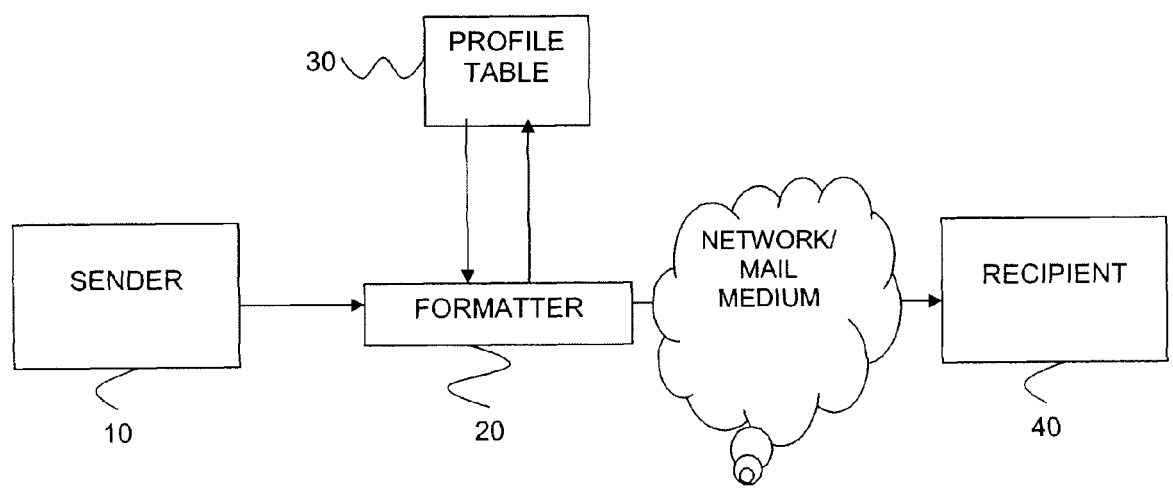
FIG. 4 shows a block diagram according to the present invention.

FIG. 4 shows a block diagram for the system and method for preference-based mail distribution according to the present invention. In particular, there is shown a sender 10. The sender 10 prepares the message to be sent. Upon completion of the message preparation, the system formats the mail in the formatter 20. The formatter 20 will format the mail in accordance with either the sender 10 preferences, or in accordance with the recipient's preferences which are stored in a profile table 30. Once the message is fully formatted in accordance with stored or otherwise specified preferences, the message is sent to the recipient 40. The operation of the system shown in FIG. 4 will be better understood with references to the methodology shown in FIGS. 1, 2A and 2B.

Figure 1:
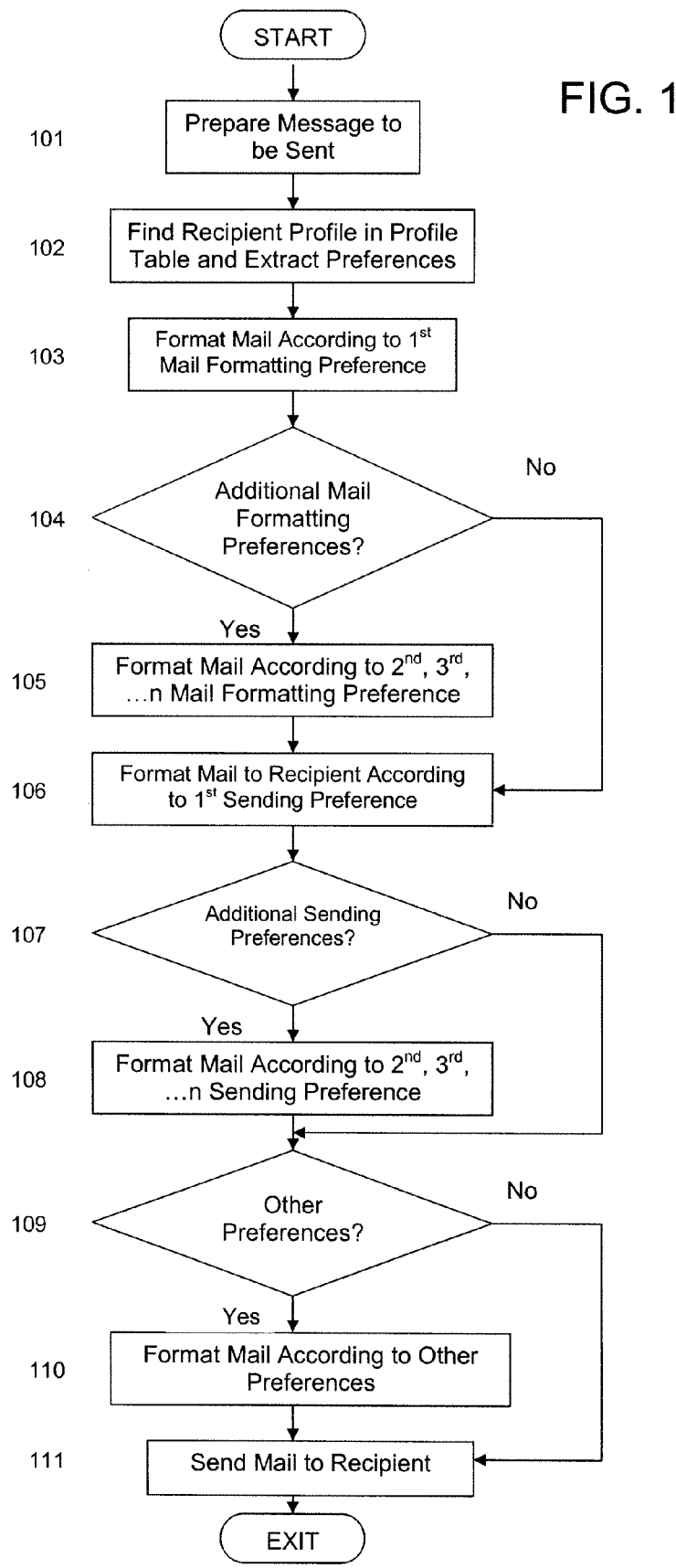
FIG. 1 shows a flow chart illustrating the system and method according to one embodiment of the present invention.

FIG. 1 shows flow chart illustrating the method for preference-based mail distribution according to the present invention. However, it will be understood by those skilled in the art that the functionality depicted therein may be considered as a high level block diagram in accordance with the invention. The steps according to FIG. 1 proceed as follows:

Step 101: The user prepares a message to be sent. As previously mentioned, the present invention assumes that the user prepares the message in an electronic or digital format. However, the present invention does contemplate the preparation in other formats, such as a paper-based message.

Step 102: Upon completion of the message preparation, the system finds the recipient's profile in the profile table and extracts the recipient's preferences. Preferably, the system is able to automatically locate the recipient's profile and corresponding preferences by cross-referencing the recipient's name, address, or any other recipient identifier in the user-prepared message with a corresponding identifier in the profile table.

Step 103: The system formats the message according to the first mail formatting preference in the profile. The system analyzes the first mail formatting preference and automatically formats the message in accordance with that first preference. Step 103 is the beginning of the formatting process.

Step 104: The system analyzes the recipient profile to determine if there are further mail formatting preferences. If there are such additional preferences, then the system proceeds to Step 105. If there are no such additional preferences, then the system proceeds to Step 106.

Step 105: The system performs Step 105 only if additional mail formatting preferences are required. If so, then the system analyzes the second mail formatting preferences and automatically formats the message in accordance with the second preference. The system repeats Step 105 until all mail formatting preferences in the recipient's profile have been completed.

Step 106: After the message itself is formatted, then the system analyzes the recipient's profile to determine the preferred method of sending the message. The system automatically formats the message in accordance with the sending preference.

Step 107: The system analyzes the recipient profile to determine if there are further sending preferences. If there are such additional preferences, then the system proceeds to Step 108. If there are no such additional preferences, then the system proceeds to Step 109.

Step 108: The system performs Step 108 only if additional sending preferences are required. If so, then the system analyzes the second sending formatting preference and automatically formats the message in accordance with the second preference. The system repeats Step 108 until all sending preferences in the recipient's profile have been completed.

Step 109: Preferably, the system provides for other preferences that do not fall into mail formatting or sending preference categories. If there are other preferences in the recipient's profile, such as a reminder or retransmission after a delay, then the system proceeds to Step 110. If no other preferences are required, then the system proceeds to Step 111.

Step 110: The system only performs Step 110 if other preferences are required. If so, then the system automatically formats the message in accordance with the other preferences.

Step 111: If the sending preferences demand an electronic or digital delivery, then the system automatically sends the message to the recipient in accordance with the recipient's preferences. If the message is to be sent in paper, or other hard copy format, by other than electronic delivery, then the system prepares the message accordingly and the user prints the message, burns a CD with the message, or in whatever other format the recipient's profile demands. The user will then manually send the message using standard postal delivery methods.

The method and system as outlined above may be best described by way of example. Using profile number 5 in the Profile Table as shown in FIG. 3 as an example, it is shown that the recipient prefers to have its message in Spanish and in a printed format sent to his mailing address via first-class mail. In addition, the recipient also prefers to have a notification sent to his PDA once the mail has been sent.

Using this example, and still referring to FIG. 1, the user would prepare the message in English to be sent to Tom Franks (Step 101). Once ready to be sent, the system accesses the profile table and extracts the preferences associated with "Tom Franks" (Step 102). The system then formats the mail such that the language is translated from English into Spanish (Step 103). Because further mail formatting is required (Step 104), the system prints out the text (Step 105). In this example, the recipient has requested that the message be printed and sent to him via first-class mail. Accordingly, the user manually puts the printed message in an envelope with appropriate postage (Step 106). No additional sending preferences are required (Step 107). There is, however, an additional preference (Step 109) in that the recipient has requested an electronic message sent to his PDA notifying him that the mail has been sent. Thus, once message is prepared for mailing, the system will automatically send an electronic message to the recipient's PDA as required (Step 110). The mail is then sent to the recipient (Step 111), and the system is exited.

It will be clear to one skilled in the art that the above embodiment may be altered in terms of the order of steps depending on the preferences requested by the recipient. Using the aforementioned example, it may be easier or more rational to mail the message in accordance with the recipient's sending preferences before sending the electronic message to the recipient's PDA in accordance with the other preferences. Thus, the present invention contemplates altering the steps in order to ensure maximum compliance with the communications preferences.

Figure 2A:
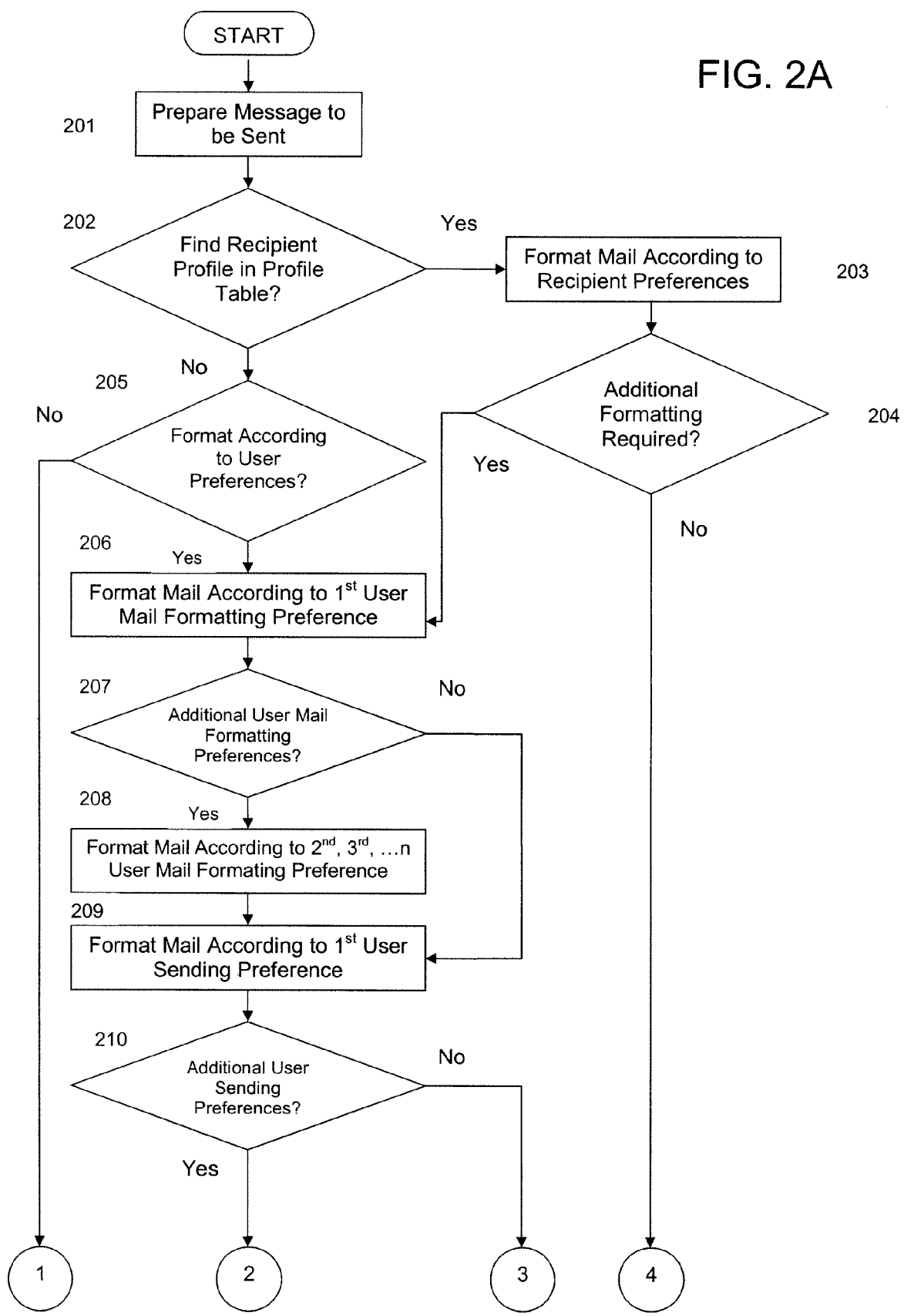
FIGS. 2A and 2B show a flow chart illustrating the system and method according to an alternative embodiment of the present invention.
Figure 2B:
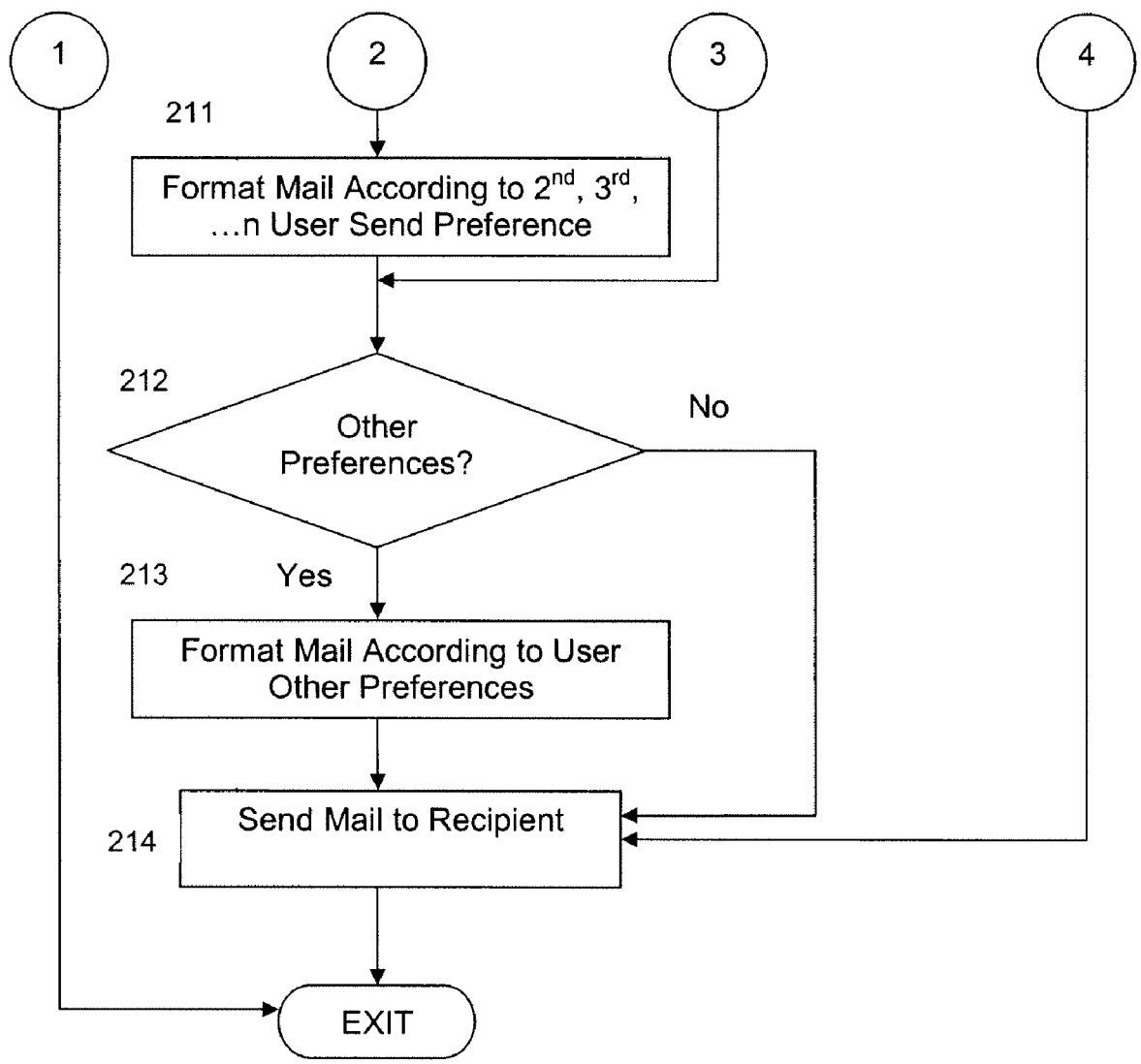

Now referring to FIGS. 2A and 2B, there is shown a flow chart illustrating the system and method for preference-based mail distribution according to an alternative embodiment of the present invention. However, it will be understood by those skilled in the art that the functionality depicted therein may be considered as a high level block diagram in accordance with the invention. The steps according to FIGS. 2A and 2B proceed as follows:

Step 201: The user prepares a message to be sent. As previously mentioned, the present invention assumes that the user prepares the message in an electronic or digital format. However, the present invention does contemplate the preparation in other formats, such as a paper-based message.

Step 202: Upon completion of the message preparation, the system prompts the user to find the recipient's profile in the profile table. If the user wishes to format the message according to the communications preferences in the profile table, then the system proceeds to Step 203. If the user wishes to format the message according to the user's preferences, then the system proceeds to Step 205.

Step 203: The system formats the message according to the recipient's communications preference as identified in the recipient's profile. This formatting is done in a similar manner as shown in FIG. 1 and as previously discussed.

Step 204: Upon completion of the formatting performed in Step 203, the system prompts the user for additional formatting. Step 204 is a perfecting step that gives the user the opportunity to format the message beyond the communications preferences found in the recipient's profile. This perfecting step is useful if the recipient requires a one-time change to its communications preferences, thus preventing the need to update or revise the recipient's profile. If the user does not wish to format the message further, then the system proceeds to Step 214. If the user does wish to format the message further, then the system proceeds to Step 206.

Step 205: The system performs Step 205 if the user does not wish to extract the recipient's preferences (if any) from the profile table and format the message accordingly. Step 205 gives the user the option to format the message according to the user's preferences. If the user does not wish to format the message accordingly, then the user exits the system. If the user does wish to format the mail according to user preferences, rather than recipient preferences, then the system proceeds to Step 206.

Step 206: The system formats the message according to the user's first mail formatting preference. The preferences available for formatting the message can be, preferably, presented to the user in a window that appears once the system proceeds to Step 206. The window can include a drop-down list that includes all available means for formatting the message itself. Once the user chooses its mail formatting preference from the available preferences, the system formats the message accordingly.

Step 207: The system prompts the user for additional user mail formatting preferences. If the user does not wish to apply additional mail formatting preferences, then the system proceeds to Step 209. If the user does wish to format the mail further, then the system proceeds to Step 208.

Step 208: The system performs Step 208 only if additional user mail formatting preferences are required. If so, then the system presents the available mail formatting preferences to the user, and the user chooses the next desired mail formatting preference, in the same fashion as outlined in Step 206. The system then formats the message accordingly. The system repeats Step 208 until all user mail formatting preferences have been completed.

Step 209: After the message itself is formatted in accordance with the user's mail formatting preferences, the system then formats the message according to the user's first sending preference. The preferences available for sending the message can be, preferably, presented to the user in a window that appears once the system proceeds to Step 209. The window can include a drop-down list, sometimes referred to as a pull-down menu, that includes all available means for sending the message itself. Once the user chooses its sending preference from the available preferences, the system formats the message accordingly.

Step 210: The system prompts the user for additional user sending preferences. If the user does not wish to apply additional sending preferences, then the system proceeds to Step 212. If the user does wish to apply additional sending preferences, then the system proceeds to Step 211.

Step 211: The system performs Step 211 only if additional sending preferences are required. If so, then the system presents the available sending preferences to the user, and the user chooses the next desired sending preference, in the same fashion as outlined in Step 209. The system then formats the message accordingly. The system repeats Step 211 until all user sending preferences have been completed.

Step 212: The system prompts the user for other preferences. If other preferences are required, then the system proceeds to Step 213. If not, then the system proceeds to Step 214.

Step 213: The other preferences available can be, preferably, presented to the user in a window that appears once the system proceeds to Step 212. The window can include a drop-down list that includes all available other preferences. Preferably, the window can also include an option for the user to manually enter an "other" preferences if not available in the system. Once the user chooses its other preference, the system formats the message accordingly.

Step 214: Once the message has been fully formatted, the message is sent to the recipient. If the user entered a sending preference for an electronic or digital delivery, then the system automatically sends the message to the recipient accordingly. If the message is to be sent in paper, or other hard copy format, by other than electronic delivery, then the system prepares the message accordingly and the user prints the message, burns a CD with the message, or in whatever other format required. The user will then manually send the message using standard postal delivery methods.

The method and system as outlined above may be best described by way of example. Using profile number 3 in the Profile Table as shown in FIG. 3 as an example, it is shown that the recipient prefers to have its message in digital text and, more specifically, in .rtf format, sent to his digital mailbox (unless the message is an invitation to a social event, in which case the message is sent to the recipient's e-mail address). The user wishes to send an invitation to a social event to John Lock. However, the user is aware that John Lock's e-mail is temporarily not working and, thus, wishes to send all messages to the digital mailbox (which is accessible only by the user and John Lock).

Using this example, and still referring to FIGS. 2A and 2B, the user would prepare the message to be sent to John Lock (Step 201). Once ready to be sent, the system prompts the user to find John Lock's profile in the profile table (Step 202). The user can either (a) format the mail according to John Lock's preferences (Step 203) and, when prompted for additional formatting (Step 204), indicate yes and alter the preferences at Steps 206-213; or (b) manually format the message according to the user's preferences. In this example, the user decides to manually format the message according to the user's preferences (Step 205). At Step 206, the user is presented with various available preferences for mail formatting. The user chooses digital text (Step 206). The system prompts the user for additional mail formatting preferences (Step 207) and the user chooses to further format the message into .rtf format (Step 208). Because no further mail formatting is required, at Step 209, the user is presented with various available preferences for sending. The user chooses the digital mailbox. Because no additional sending preferences are required (Step 210), and no other preferences are needed (Steps 212-213), the system then sends the message to John Lock's digital mail box (Step 214), which is only accessible by the user and John Lock.

It will be clear to one skilled in the art that the above embodiment may be altered in many ways without departing from the scope of the invention. Accordingly, the scope of the invention should be determined by the following claims and their legal equivalents.

Having thus described our invention, what we claim as new and desire to secure by Letters Patent is as follows:

1. A system for provision of communications from a sender in a format and by a medium preferred by a recipient, said system comprising:
    means for collection and storage of one or more communications preferences of a plurality of persons to whom said communications are to be provided by said sender in regard to formatting and one or more preferences in regard to communication media for a communication,
    means for providing a communication by said sender for a person of said plurality of persons,
    means for selecting at least one transmission medium or format from a plurality of media and/or formats in accordance with said communications preferences of said person collected by said means for collection and storage, and
    means for converting said communication to be sent under control of said sender by said transmission medium and/or in said format responsive to said means for selecting at least one transmission medium or format.

2. The system according to claim 1, wherein said plurality of media and/or formats includes at least one of the following:
    a selected commercially available word processing media and/or format;
    a selected commercially available graphics media and/or format;
    a selected commercially available audio media and/or format;
    a selected commercially available video media and/or format; or
    a selected commercially available braille media and/or format.

3. The system according to claim 1, wherein said communications preferences include at least one mail formatting preference and at least one sending preference.

4. The system according to claim 3, wherein said mail formatting preference includes at least one of the following: digital text, printed text, braille, audio, video or image.

5. The system according to claim 4, wherein said mail formatting preference may further include at least one of the following: file format, font, size, language, sound setting, color or file compression.

6. The system according to claim 3, wherein said sending preference includes at least one of the following: postal services delivery or electronic delivery.

7. The system according to claim 6, wherein said electronic delivery can further include at least one of the following modes of delivery: e-mail, digital mailbox, telephone or PDA.

8. The system according to claim 6, wherein said postal services delivery can further include at least one of the following modes of delivery: first class mail, overnight delivery, or certified mail.

9. The system according to claim 1, wherein said communications preferences are collected and stored in a profile table.

10. The system according to claim 9, wherein said communications preferences in said profile table correspond to said selected ones of said persons.

11. A method for collection and storage of communications preferences of persons to whom a communication is to be provided under control of a sender and delivering said communication from a sender to selected ones of said persons in accordance with said communications preferences, comprising the steps of:
    a. identifying said selected ones of said persons of a plurality of persons in a profile table to whom said communication is to be delivered under control of said sender, wherein said profile table contains one or more collected communications preferences of respective persons of said plurality of persons in regard to format and transmission media for communications;
    b. selecting at least one transmission medium or format from a plurality of media and/or formats in accordance with said communications preferences;
    c. converting said communication to one or more formats selected in said selecting step; and
    d. delivering said communication in accordance with one or more transmission media selected in said selecting step to said selected ones of said persons.

12. The method according to claim 11, further comprising the step of extracting said communications preferences associated with said selected ones of said persons, wherein said extracting step follows said identifying step.

13. The method according to claim 11, wherein said plurality of media and/or formats in said selecting step includes at least one of the following:
- a selected commercially available word processing media and/or format;
- a selected commercially available graphics media and/or format;
- a selected commercially available audio media and/or format;
- a selected commercially available video media and/or format; or
- a selected commercially available braille media and/or format.

14. The method according to claim 11, wherein said communications preferences include at least one mail formatting preference and at least one sending preference.

15. The method according to claim 14, wherein said mail formatting preference includes at least one of the following: digital text, printed text, braille, audio, video or image.

16. The method according to claim 15, wherein said mail formatting preference may further include at least one of the following: file format, font, size, language, sound setting, color or file compression.

17. The method according to claim 14, wherein said sending preference includes at least one of the following: postal services delivery or electronic delivery.

18. The method according to claim 16, wherein said electronic delivery can further include at least one of the following modes of delivery: e-mail, digital mailbox, telephone or PDA.

19. The method according to claim 11, wherein said communications preferences are collected and stored in a profile table.

20. The method according to claim 19, wherein said communications preferences in said profile table correspond to said selected ones of said persons.

* * * * *